(12) United States Patent
Imai et al.

(10) Patent No.: US 11,492,059 B2
(45) Date of Patent: Nov. 8, 2022

(54) SADDLE RIDING VEHICLE

(71) Applicant: HONDA MOTOR CO., LTD., Tokyo (JP)

(72) Inventors: Yoshiyuki Imai, Tokyo (JP); Hironori Nakamura, Tokyo (JP); Naoki Kobayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 116 days.

(21) Appl. No.: 16/929,598

(22) Filed: Jul. 15, 2020

(65) Prior Publication Data
US 2021/0061390 A1  Mar. 4, 2021

(30) Foreign Application Priority Data
Aug. 27, 2019  (JP) .............................. JP2019-154425

(51) Int. Cl.
| *B62J 13/02* | (2006.01) |
| *B62K 25/28* | (2006.01) |
| *B62K 11/04* | (2006.01) |
| *B62M 7/02*  | (2006.01) |
| *B62M 9/00*  | (2006.01) |

(52) U.S. Cl.
CPC .............. *B62J 13/02* (2013.01); *B62K 11/04* (2013.01); *B62K 25/283* (2013.01); *B62M 7/02* (2013.01); *B62M 2009/007* (2013.01)

(58) Field of Classification Search
CPC .......................... B62M 2009/007; B62J 13/02
USPC ........................................................ 180/227
See application file for complete search history.

(56) References Cited

U.S. PATENT DOCUMENTS

| 4,993,508 A |   | 2/1991 | Nozoe et al. |
| 7,691,019 B2 | * | 4/2010 | Gogo ....................... B62J 13/00 |
| | | | 474/140 |

(Continued)

FOREIGN PATENT DOCUMENTS

| JP | 61-142697 U | 9/1986 |
| JP | 2013-147219 | 8/2013 |

(Continued)

OTHER PUBLICATIONS

German Office Action with English translation dated Nov. 3, 2021, Application No. 102020122131.2, 11 pages.

(Continued)

*Primary Examiner* — Kevin Hurley
*Assistant Examiner* — Hosam Shabara
(74) *Attorney, Agent, or Firm* — Rankin, Hill & Clark LLP

(57) ABSTRACT

In a saddle riding vehicle including: a swing arm that supports a rear wheel; a sprocket disposed at the rear wheel; and a chain that meshes with the sprocket to thereby drive the rear wheel, the rear wheel includes a rear wheel-side protruding portion that protrudes from the sprocket to an outside in a vehicle width direction, a chain cover fastening portion, to which a chain cover for covering the chain is fastened, is disposed on the outside in the vehicle width direction with respect to the rear wheel-side protruding portion and protrudes to an inside in the vehicle width direction, and the chain cover fastening portion is disposed at a position at which the chain cover fastening portion overlaps the rear wheel-side protruding portion in a vehicle side view.

7 Claims, 4 Drawing Sheets

(56) References Cited

U.S. PATENT DOCUMENTS

| | | | |
|---|---|---|---|
| 8,561,750 B2 * | 10/2013 | Kakimoto | F16H 7/18 |
| | | | 474/140 |
| 10,279,860 B2 * | 5/2019 | Hiramaru | B62M 9/16 |
| 2002/0160869 A1 | 10/2002 | Barnett | |
| 2007/0032324 A1 | 2/2007 | Uchiyama et al. | |

FOREIGN PATENT DOCUMENTS

| | | |
|---|---|---|
| JP | 2016-147618 A | 8/2016 |
| WO | WO-2021166438 A1 * | 8/2021 |

OTHER PUBLICATIONS

Indian Office Action dated Dec. 22, 2021, Application No. 202014029393, 5 pages.

Salatprynz, Dec. 2, 2017, "Honda CRF1000L Africa Twin Adventure Sports", https://gasgriffsalat.com/2017/12/02/honda-crf1000l-africa-twin-adventure-sports-2018/; 12 pages.

Chinese Office Action with English Translation dated Sep. 23, 2021, 12 pages.

Japanese Office Action dated Aug. 30, 2022 issued in corresponding Japanese Application No. 2019-154425 English machine translation included (11 pages).

\* cited by examiner

SADDLE RIDING VEHICLE

INCORPORATION BY REFERENCE

The present application claims priority under 35 U.S.C. § 119 to Japanese Patent Application No. 2019-154425 filed on Aug. 27, 2019. The content of the application is incorporated herein by reference in its entirety.

TECHNICAL FIELD

The present invention relates to a saddle riding vehicle.

BACKGROUND ART

A known saddle riding vehicle includes a swing arm provided with a chain receiving piece that receives a chain that has fallen off a sprocket (see, for example, Patent Document 1). In the configuration disclosed in Patent Document 1, the chain receiving piece extends toward an inside in a vehicle width direction from the swing arm such that the chain receiving piece is flush with an upper surface of the swing arm.

PRIOR ART DOCUMENT

Patent Document

[Patent Document 1]
Japanese Patent Application Laid-open No. 2013-147219

SUMMARY OF THE INVENTION

Problem to be Solved by the Invention

A need exists for the saddle riding vehicle to receive effectively the chain that has fallen off with a simple structure.

The present invention has been made in view of the foregoing situation and it is an object of the present invention to enable, in a saddle riding vehicle, a chain that has fallen off to be effectively received by a simple structure.

Means for Solving the Problem

To achieve the foregoing object, an aspect of the present invention provides a saddle riding vehicle that includes: a swing arm (13) that supports a rear wheel (3); a sprocket (31) disposed at the rear wheel (3); and a chain (32) that meshes with the sprocket (31) to thereby drive the rear wheel (3). In the saddle riding vehicle, the rear wheel (3) includes a rear wheel-side protruding portion (58) that protrudes from the sprocket (31) to an outside in a vehicle width direction, a chain cover fastening portion (40), to which a chain cover (33) for covering the chain (32) is fastened, is disposed on the outside in the vehicle width direction with respect to the rear wheel-side protruding portion (58) and protrudes to an inside in the vehicle width direction, and the chain cover fastening portion (40) is disposed at a position at which the chain cover fastening portion (40) overlaps the rear wheel-side protruding portion (58) in a vehicle side view.

In the foregoing configuration, preferably, a gap (G) between the chain cover fastening portion (40) and the rear wheel-side protruding portion (58) in the vehicle width direction is smaller than a width (W) of the chain (32) under a condition in which the chain cover fastening portion (40) overlaps the rear wheel-side protruding portion (58).

In the foregoing configuration, preferably, the chain cover fastening portion (40) is disposed superior to an upper surface (37) of the swing arm (13).

In the foregoing configuration, preferably, the chain cover fastening portion (40) extends to the inside in the vehicle width direction from a superiorly extended portion (39) that extends superiorly from the upper surface (37) of the swing arm (13).

In the foregoing configuration, preferably, the chain cover (33) is fastened to an outer side surface (40a) on the outside in the vehicle width direction of the chain cover fastening portion (40).

In the foregoing configuration, preferably, an end portion (40b) on the inside in the vehicle width direction of the chain cover fastening portion (40) is disposed on the inside in the vehicle width direction with respect to a side surface portion (43) that is a portion inside, in the vehicle width direction, of a portion disposed inferior to and posterior to the end portion (40b) in the swing arm (13).

In the foregoing configuration, preferably, the rear wheel-side protruding portion (58) serves as a fastening part (55) that fastens the sprocket (31) to the rear wheel (3).

In the foregoing configuration, preferably, the chain cover fastening portion (40) is formed integrally with the swing arm (13).

Effects of the Invention

The saddle riding vehicle includes: the swing arm that supports the rear wheel; the sprocket disposed at the rear wheel; and the chain that meshes with the sprocket to thereby drive the rear wheel. In the saddle riding vehicle, the rear wheel includes the rear wheel-side protruding portion that protrudes from the sprocket to the outside in the vehicle width direction, the chain cover fastening portion, to which the chain cover for covering the chain is fastened, is disposed on the outside in the vehicle width direction with respect to the rear wheel-side protruding portion and protrudes to the inside in the vehicle width direction, and the chain cover fastening portion is disposed at the position at which the chain cover fastening portion overlaps the rear wheel-side protruding portion in a vehicle side view.

Through the foregoing configuration, the gap between the chain cover fastening portion and the rear wheel-side protruding portion is narrow, so that the chain can be received by the chain cover fastening portion and the rear wheel-side protruding portion. Thus, a fallen off chain can be effectively received by a simple structure. The use of the chain cover fastening portion for receiving the chain promotes reduction in weight and in the number of parts used.

In the foregoing configuration, the gap between the chain cover fastening portion and the rear wheel-side protruding portion in the vehicle width direction may be smaller than the width of the chain under a condition in which the chain cover fastening portion overlaps the rear wheel-side protruding portion.

Through the foregoing configuration, the chain is unable to pass through a gap between the chain cover fastening portion and the rear wheel-side protruding portion, so that the chain can be effectively received.

In the foregoing configuration, the chain cover fastening portion may be disposed superior to the upper surface of the swing arm.

Through the foregoing configuration, the chain cover fastening portion can receive the chain at a position superior to the upper surface of the swing arm, so that the chain can be effectively prevented from contacting the swing arm. Additionally, the chain cover can be built small vertically.

In the foregoing configuration, the chain cover fastening portion may extend to the inside in the vehicle width direction from the superiorly extended portion that extends superiorly from the upper surface of the swing arm.

Through the foregoing configuration, the chain cover fastening portion can have a long length in the vehicle width direction and the chain cover fastening portion and the superiorly extended portion can generally be built small.

In the foregoing configuration, the chain cover may be fastened to the outer side surface on the outside in the vehicle width direction of the chain cover fastening portion.

Through the foregoing configuration, a fallen off chain can be prevented from contacting the chain cover and the chain cover can be readily fastened to the chain cover fastening portion from the outside in the vehicle width direction.

In the foregoing configuration, the end portion on the inside in the vehicle width direction of the chain cover fastening portion may be disposed on the inside in the vehicle width direction with respect to the side surface portion that is a portion inside, in the vehicle width direction, of the portion disposed inferior to and posterior to the end portion in the swing arm.

Through the foregoing configuration, because the gap between the chain cover fastening portion and the rear wheel-side protruding portion is narrow, so that a fallen off chain can be received effectively.

In the foregoing configuration, the rear wheel-side protruding portion may serve as the fastening part that fastens the sprocket to the rear wheel.

Through the foregoing configuration, the chain can be received by a simple structure using the fastening part that fastens the sprocket to the rear wheel.

In the foregoing configuration, the chain cover fastening portion may be formed integrally with the swing arm.

Through the foregoing configuration, the chain cover fastening portion can be easily provided.

MODE FOR CARRYING OUT THE INVENTION

Figure 1:
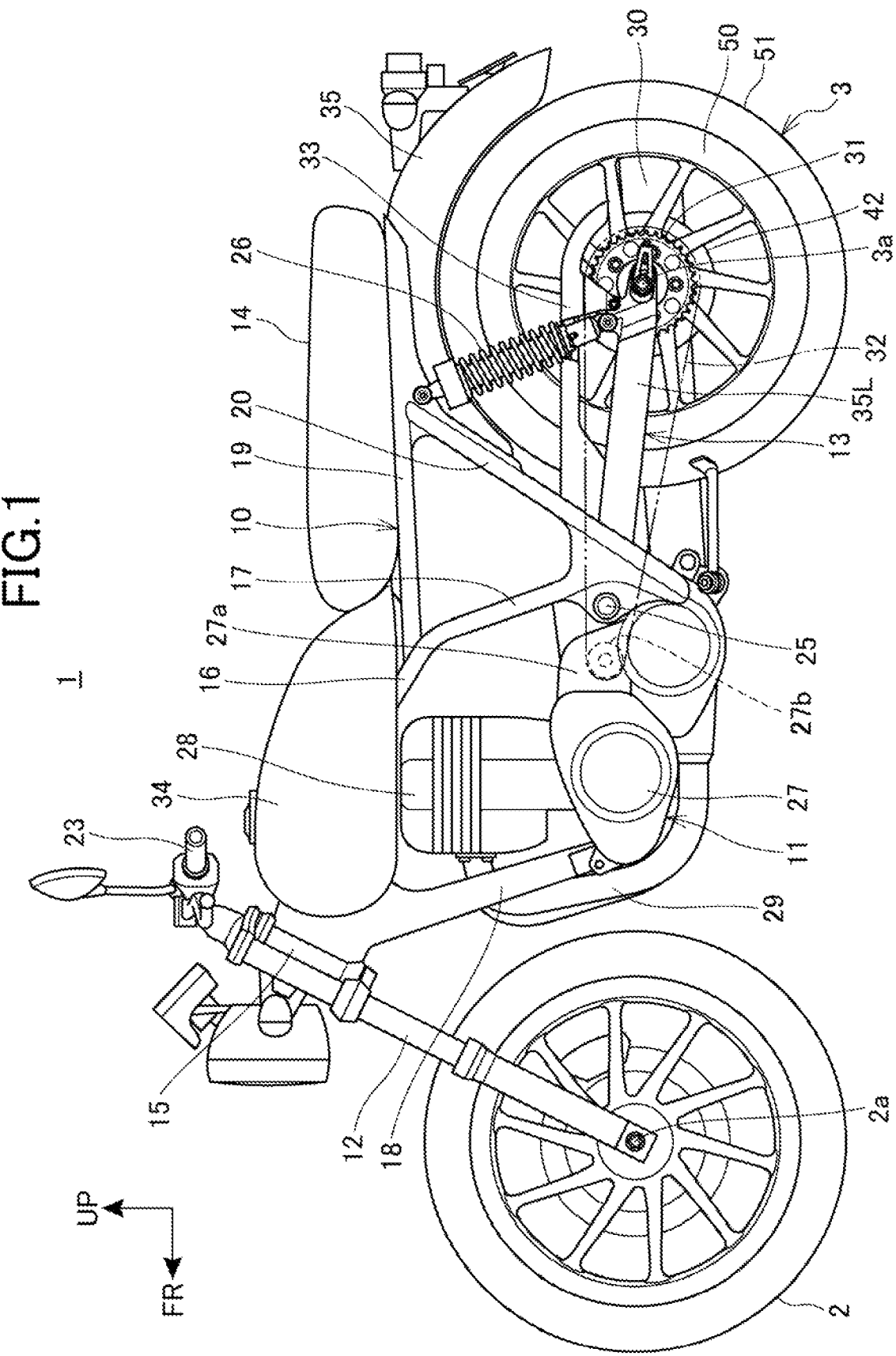
FIG. 1 is a left side view of a motorcycle according to an embodiment of the present invention.

An embodiment of the present invention will be described below with reference to the accompanying drawings. Throughout the descriptions given hereunder, expressions indicating directions including front and rear, right and left, and upper and lower mean the same directions as those in a vehicle body unless otherwise specified. In the drawings, an arrow FR indicates an anterior direction of the vehicle body, an arrow UP indicates a superior direction of the vehicle body, and an arrow LH indicates a leftward direction of the vehicle body.

FIG. 1 is a left side view of a motorcycle 1 according to an embodiment of the present invention.

The motorcycle 1 includes an engine 11, a front fork 12, and a swing arm 13. The engine 11 as a power unit is supported by a vehicle body frame 10. The front fork 12, which steerably supports a front wheel 2, is steerably supported at a front end of the vehicle body frame 10. The swing arm 13, which supports a rear wheel 3, is disposed at a rear portion of the vehicle body frame 10.

The motorcycle 1 is a saddle riding vehicle in which an occupant straddles a seat 14. The seat 14 is disposed superior to the rear portion of the vehicle body frame 10.

The vehicle body frame 10 includes a head pipe 15, a main frame 16, a center frame 17, and a down frame 18. The head pipe 15 is disposed at a front end of the vehicle body frame 10. The main frame 16 extends from the head pipe 15 downwardly toward the rear. The center frame 17 extends from a rear end of the main frame 16 downwardly. The down frame 18 extends downwardly toward the rear from an inferior side of the main frame 16 in the head pipe 15.

The vehicle body frame 10 further includes a seat frame 19 and a sub-frame 20. The seat frame 19 extends from a rear end portion of the main frame 16 toward the rear. The sub-frame 20 extends from a lower portion of the center frame 17 upwardly toward the rear and is connected with a rear portion of the seat frame 19.

The front fork 12 is rotatably supported by the vehicle body frame 10 via a steering shaft (not depicted) that is passed through the head pipe 15. A steering handlebar 23 is disposed at an upper end portion of the front fork 12. The front wheel 2 is journaled by an axle 2a, which is disposed at a lower end portion of the front fork 12.

The swing arm 13 is journaled by a pivot shaft 25. The pivot shaft 25 is supported by the center frame 17, which is provided in plurality at left and right. The pivot shaft 25 extends horizontally in a vehicle width direction. The swing arm 13 has a front end portion journaled by the pivot shaft 25 and thereby oscillates vertically around the pivot shaft 25.

The rear wheel 3 is journaled by an axle 3a, which is disposed at a rear end portion of the swing arm 13.

The motorcycle 1 includes a pair of left and right rear suspensions 26. The rear suspensions 26 each extend across the rear end portion of the swing arm 13 and the seat frame 19.

The engine 11 is disposed at a position between the down frame 18 and the center frames 17 in a vehicle fore-aft direction and inferior to the main frame 16. The engine 11 is fixed to the vehicle body frame 10.

The engine 11 includes a crankcase 27 and a cylinder portion 28. The crankcase 27 supports a crankshaft (not depicted) that extends horizontally in the vehicle width direction (left-right direction). The cylinder portion 28 is disposed at an upper portion of a front portion of the crankcase 27.

An exhaust pipe 29 of the engine 11 extends downwardly from an exhaust port in a front surface of the cylinder portion 28 and further extends toward the rear. A muffler 30 is disposed at an outer lateral side of the rear wheel 3 and connected with a rear end of the exhaust pipe 29.

A rear portion of the crankcase 27 constitutes a transmission case portion 27a, in which a transmission is housed. An output power from the engine is transmitted to the rear wheel 3 by a chain 32. The chain 32 connects a drive sprocket 27b, which is disposed at an output shaft of the transmission, and a sprocket 31 of the rear wheel 3.

A chain cover 33, which covers the chain 32, is mounted on the swing arm 13.

A fuel tank 34 is disposed at a position superior to the main frame 16 and between the head pipe 15 and the seat 14.

A rear fender 35, which covers the rear wheel 3 from above, is disposed inferior to the seat 14 and supported by the seat frame 19.

Figure 2:
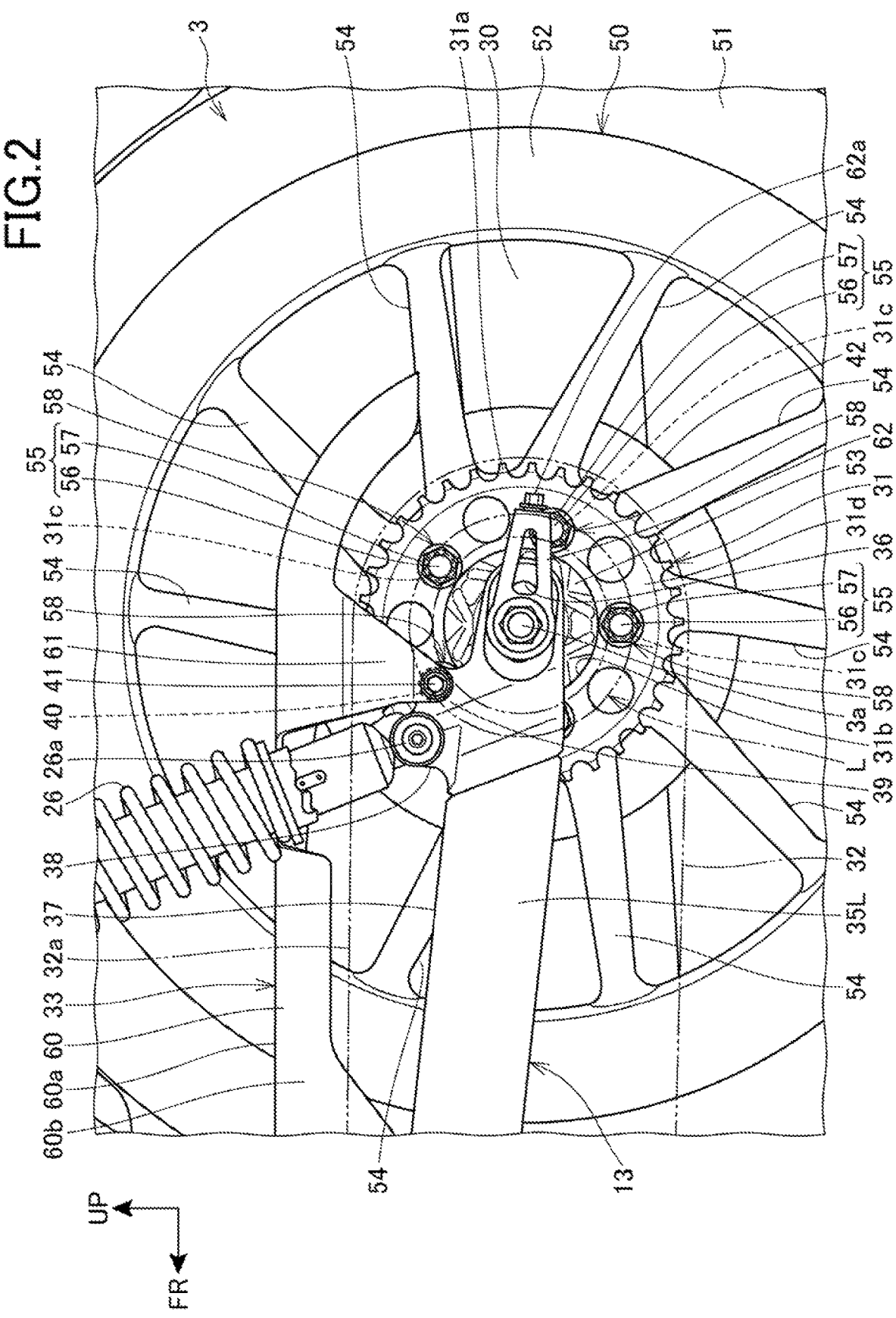
FIG. 2 is a side view of a rear portion of a swing arm and a rear wheel, as viewed from a left side.
Figure 3:
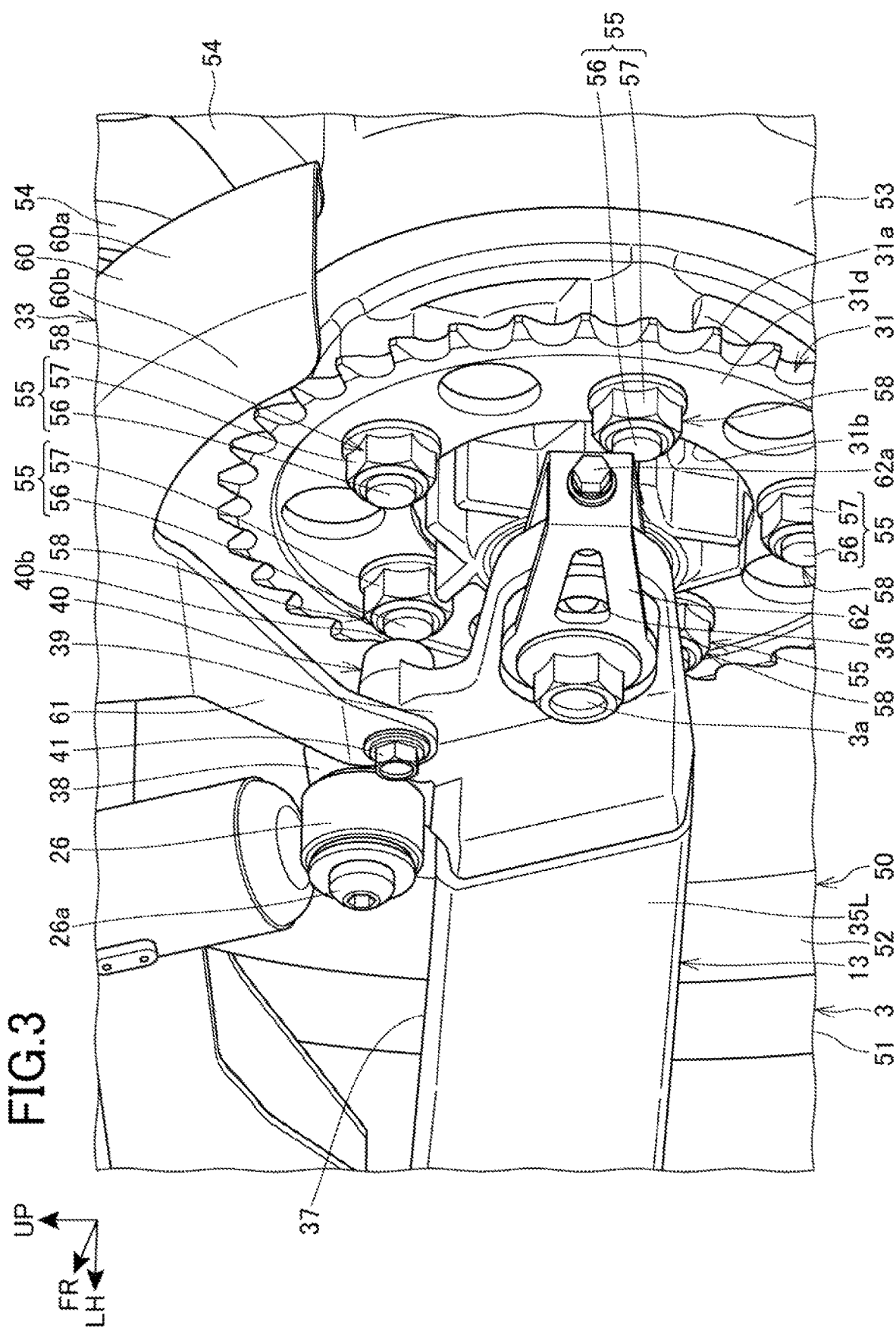
FIG. 3 is a perspective view of the rear wheel and parts therearound, as viewed from a left posterior side.
Figure 4:
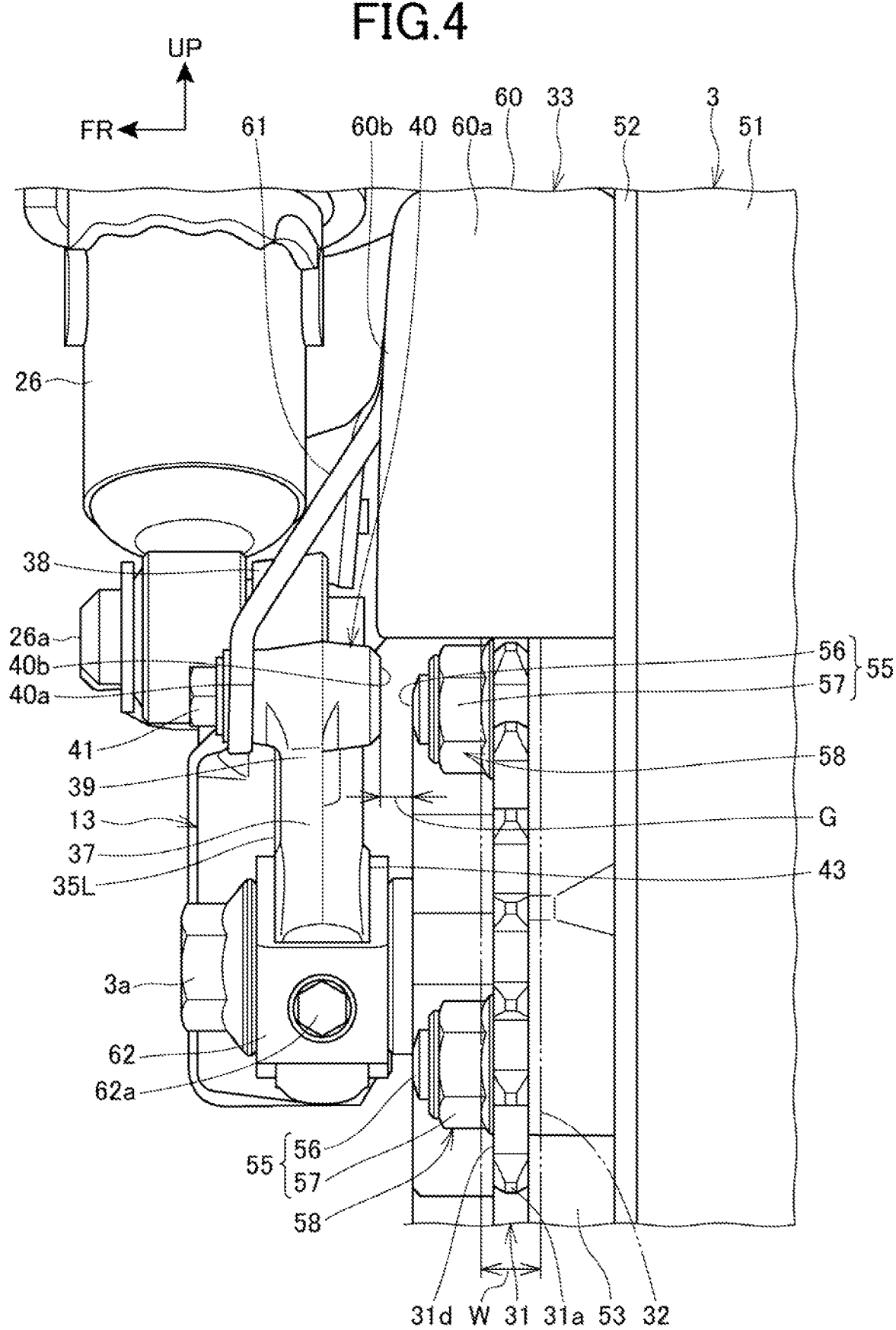
FIG. 4 is an illustration of the rear wheel and parts therearound, as viewed from a posterior side.

FIG. 2 is a side view of a rear portion of the swing arm 13 and the rear wheel 3, as viewed from a left side. FIG. 3 is a perspective view of the rear wheel 3 and parts therearound, as viewed from a left posterior side. FIG. 4 is an illustration of the rear wheel 3 and parts therearound, as viewed from a posterior side. FIG. 3 omits depicting the chain 32.

Reference is made to FIGS. 1 to 4. The swing arm 13 includes a first-side arm portion 35L and a second-side arm portion (not depicted) and a cross member (not depicted). The first-side arm portion 35L and the second-side arm portion are disposed at left and right of the rear wheel 3. The cross member connects the first-side arm portion 35L and the second-side arm portion in the vehicle width direction at a position anterior to the rear wheel 3.

The pivot shaft 25 is passed through a front end portion of the first-side arm portion 35L and a front end portion of the second-side arm portion.

The first-side arm portion 35L extends in the vehicle fore-aft direction along the left side of the rear wheel 3. The second-side arm portion extends in the vehicle fore-aft direction along the right side of the rear wheel 3.

An axle support hole 36, which supports the axle 3a, is provided in each of a rear end portion of the first-side arm portion 35L and a rear end portion of the second-side arm portion. The axle support hole 36 is a slot longer in length in the vehicle fore-aft direction. The axle 3a is passed through the axle support holes 36 at left and right in the vehicle width direction.

A suspension connection portion 38, with which a lower end portion of the rear suspension 26 is connected, is provided on an upper surface 37 of the first-side arm portion 35L. The suspension connection portion 38 extends superiorly from the upper surface 37 and is disposed anterior to the axle 3a.

The lower end portion of the rear suspension 26 is fastened to an outer side surface in the vehicle width direction of the suspension connection portion 38 by a suspension fixing bolt 26a.

A superiorly extended portion 39 and a chain cover fastening portion 40 are also provided on the upper surface 37 of the first-side arm portion 35L. The superiorly extended portion 39 extends superiorly from the upper surface 37. The chain cover fastening portion 40 extends from an upper portion of the superiorly extended portion 39 to the outside and inside in the vehicle width direction.

The superiorly extended portion 39 and the chain cover fastening portion 40 are formed of a material identical to a material forming the swing arm 13 and are formed integrally with the swing arm 13.

The superiorly extended portion 39 and the chain cover fastening portion 40 are disposed posterior to the suspension connection portion 38 and anterior to the axle 3a.

The chain cover fastening portion 40 is disposed superior to the upper surface 37 of the first-side arm portion 35L. The chain cover fastening portion 40 is a tubular portion extending in the vehicle width direction. An internal thread portion is formed in an inner peripheral portion of the chain cover fastening portion 40.

A chain cover fixing part 41, which fixes a rear portion of the chain cover 33 to the swing arm 13, is fastened to the internal thread portion of the chain cover fastening portion 40 from the outside in the vehicle width direction.

The rear wheel 3 is disposed between the first-side arm portion 35L and the second-side arm portion and supported by the axle 3a.

The rear wheel 3 includes a wheel 50, which is supported by the axle 3a, and a tire 51.

The wheel 50 includes a rim 52, a hub 53, and a plurality of spokes 54. The rim 52 has a circularly annular shape in a vehicle side view. The hub 53 is disposed at a center of the rim 52. The spokes 54 connect the rim 52 with the hub 53.

The hub 53 is a tubular member extending in the vehicle width direction and has an axle hole (not depicted), through which the axle 3a is passed. The rear wheel 3 rotates around the axle 3a. The tire 51 is mounted on an outer periphery of the rim 52.

The sprocket 31 is mounted on a first side surface (left side surface) of the hub 53.

A brake disc 42 is mounted on a second side surface (right side surface) of the hub 53. A brake caliper (not depicted) that clamps the brake disc 42 to thereby brake the rear wheel 3 is supported by the second-side arm portion. The muffler 30 is disposed on an outer lateral side of the second-side arm portion.

Fastening parts 55, which fasten the sprocket 31 to the hub 53, are provided on the first side surface of the hub 53. The fastening parts 55 are disposed equidistantly in a circumferential direction of the hub 53 (rotating direction of the rear wheel 3). The fastening parts 55 are disposed along a single imaginary circle having the axle 3a as a center thereof. A distance between each of the fastening parts 55 and the axle 3a in a radial direction of the hub 53 is equal for all fastening parts 55.

More specifically, the fastening parts 55 each include a stud bolt 56 and a nut 57. The stud bolt 56 is provided in a standing condition from the first side surface of the hub 53 on the outside in the vehicle width direction. The nut 57 threadedly engages the stud bolt 56. The stud bolt 56 is disposed in parallel with the axle 3a.

The sprocket 31 is disposed on the inside in the vehicle width direction with respect to the first-side arm portion 35L.

The sprocket 31 is a disc extending orthogonally to the axle 3a. The sprocket 31 includes a toothed portion 31a on an outer periphery thereof. The toothed portion 31a meshes with the chain 32.

The sprocket 31 has a clearance hole portion 31b at a central portion thereof. The axle 3a passes through the clearance hole portion 31b.

The sprocket 31 has fixing holes 31c (FIG. 2), through which the stud bolts 56 are passed. The fixing holes 31c are formed between the clearance hole portion 31b and the toothed portion 31a in the radial direction.

The stud bolts 56 fit in the respective fixing holes 31c, so that the sprocket 31 is fastened to the first side surface of the hub 53 by the nuts 57. Specifically, the sprocket 31 is clamped between the nuts 57 and the first side surface of the hub 53.

A portion that passes through the sprocket 31 to the outside in the vehicle width direction in the stud bolt 56 and the nut 57 constitute a rear wheel-side protruding portion 58. The rear wheel-side protruding portion 58 protrudes to the outside in the vehicle width direction with respect to an outer side surface 31d of the sprocket 31.

The chain 32 is an endless member wound around the drive sprocket 27b and the sprocket 31. The chain 32 extends in the vehicle fore-aft direction along paths above and below the first-side arm portion 35L to thereby connect the drive sprocket 27b and the sprocket 31.

The chain cover 33 is disposed at a position superior to the first-side arm portion 35L and between the rear suspension 26 and the rear wheel 3.

The chain cover 33 includes a cover portion 60 and a mounting portion 61. The cover portion 60 extends in the vehicle fore-aft direction along an upper portion 32a of the chain 32. The mounting portion 61 extends inferiorly from the cover portion 60.

The cover portion 60 extends from a posterior side of the sprocket 31 to a position near the sub-frame 20. The cover portion 60 includes an upper wall portion 60a and a side wall portion 60b. The upper wall portion 60a covers the upper portion 32a of the chain 32 and the sprocket 31 from above. The side wall portion 60b covers the upper portion 32a of the chain 32 and the sprocket 31 from an outer side. The side wall portion 60b extends inferiorly from an outer side edge of the upper wall portion 60a.

The mounting portion 61 of the chain cover 33 extends from a rear portion of the side wall portion 60b of the cover portion 60 outwardly in the vehicle width direction and inferiorly toward the chain cover fastening portion 40.

The chain cover 33 has a rear portion fastened to an outer side surface 40a (FIG. 4) on the outside, in the vehicle width direction, of the chain cover fastening portion 40 by a chain cover fixing part 41. The chain cover fixing part 41 is passed through a lower end portion of the mounting portion 61 from the outside in the vehicle width direction. The mounting portion 61 is disposed outside the chain 32 in the vehicle width direction.

A chain adjuster 62, which adjusts tension in the chain 32, is disposed at each of a rear end portion of the first-side arm portion 35L and a rear end portion of the second-side arm portion.

The chain adjuster 62 is connected with the axle 3a by the axle 3a being passed through the chain adjuster 62 in the vehicle width direction. Additionally, the chain adjuster 62 is connected with each of the first-side arm portion 35L and the second-side arm portion with an adjust bolt 62a, which is inserted in a rear surface of the chain adjuster 62 from the rear.

Tension in the chain 32 is adjusted through rotation of the adjust bolt 62a. Rotation of the adjust bolt 62a causes the chain adjuster 62, the axle 3a, and the rear wheel 3 to move integrally in the vehicle fore-aft direction and the sprocket 31 to move integrally with the rear wheel 3 in the vehicle fore-aft direction.

Reference is made to FIGS. 2 to 4. The chain cover fastening portion 40 is disposed on the outside in the vehicle width direction with respect to the rear wheel-side protruding portion 58 provided on the side of the sprocket 31. In a vehicle side view, the chain cover fastening portion 40 overlaps the rear wheel-side protruding portion 58 from the outside in the vehicle width direction.

More specifically, the chain cover fastening portion 40 overlaps, in a vehicle side view, a locus L of rotation of the rear wheel-side protruding portion 58, formed as the rear wheel 3 rotates, from the outside in the vehicle width direction, where the locus L represents an area, in a vehicle side view, over which a distal end portion of the stud bolt 56 passes as the rear wheel 3 rotates. The area has a circularly annular shape having the axle 3a as the center of the circle.

An end portion 40b on the inside, in the vehicle width direction, of the chain cover fastening portion 40 is disposed on the inside in the vehicle width direction with respect to a side surface portion 43 (FIG. 4). The side surface portion 43 is a portion inside, in the vehicle width direction, of a portion disposed inferior to and posterior to the end portion 40b in the first-side arm portion 35L.

The overlapping of the chain cover fastening portion 40 with the rear wheel-side protruding portion 58 from the outside in the vehicle width direction as described above reduces a gap G between the chain cover fastening portion 40 and the rear wheel-side protruding portion 58. Thus, the chain 32, when having fallen off the sprocket 31, is hard to pass through the gap G and is thereby prevented from falling down to a position below the chain cover fastening portion 40. Thus, a fallen off chain 32 can be received by the chain cover fastening portion 40 and the rear wheel-side protruding portion 58 and can be prevented from being caught between the first-side arm portion 35L and the sprocket 31.

The gap G represents a gap in the vehicle width direction between the end portion 40b on the inside in the vehicle width direction of the chain cover fastening portion 40 and the distal end portion of the stud bolt 56. The gap G is smaller than a width W of the chain 32. Thus, a fallen off chain 32 is unable to pass through the gap G and the chain 32 can be effectively received by the chain cover fastening portion 40 and the rear wheel-side protruding portion 58.

As described above, in accordance with the embodiment to which the present invention is applied, the motorcycle 1 includes the swing arm 13, which supports the rear wheel 3, the sprocket 31, which is disposed at the rear wheel 3, and the chain 32, which meshes with the sprocket 31 to thereby drive the rear wheel 3. The rear wheel 3 includes the rear wheel-side protruding portion 58, which protrudes from the sprocket 31 to the outside in the vehicle width direction. The chain cover fastening portion 40, to which the chain cover 33 for covering the chain 32 is fastened, is provided on the outside in the vehicle width direction with respect to the rear wheel-side protruding portion 58. The chain cover fastening portion 40 protrudes to the inside in the vehicle width direction and is disposed at a position at which the chain cover fastening portion 40 overlaps the rear wheel-side protruding portion 58 in a vehicle side view.

Through the foregoing configuration, the gap G between the chain cover fastening portion 40 and the rear wheel-side protruding portion 58 is narrow, so that the chain 32 can be received by the chain cover fastening portion 40 and the rear wheel-side protruding portion 58. Thus, a fallen off chain 32 can be effectively received by a simple structure. The use of the chain cover fastening portion 40 for receiving the chain 32 promotes reduction in weight and in the number of parts used.

The gap G between the chain cover fastening portion 40 and the rear wheel-side protruding portion 58 in the vehicle width direction is smaller than the width W of the chain 32 under a condition in which the chain cover fastening portion 40 overlaps the rear wheel-side protruding portion 58.

Through the foregoing configuration, the chain 32 is unable to pass through a gap between the chain cover fastening portion 40 and the rear wheel-side protruding portion 58, so that the chain 32 can be effectively received.

Additionally, the chain cover fastening portion 40 may be disposed superior to the upper surface 37 of the swing arm 13.

Through the foregoing configuration, the chain cover fastening portion 40 can receive the chain 32 at a position superior to the upper surface 37 of the swing arm 13, so that the chain 32 can be effectively prevented from contacting the swing arm 13. Additionally, the chain cover 33 can be built small vertically.

Additionally, the chain cover fastening portion 40 extends to the inside in the vehicle width direction from the superiorly extended portion 39, which extends superiorly from the upper surface 37 of the swing arm 13.

Through the foregoing configuration, the chain cover fastening portion 40 can have a long length in the vehicle width direction and the chain cover fastening portion 40 and the superiorly extended portion 39 can generally be built small.

Additionally, the chain cover 33 is fastened to the outer side surface 40a on the outside, in the vehicle width direction, of the chain cover fastening portion 40.

Through the foregoing configuration, a fallen off chain 32 can be prevented from contacting the chain cover 33 and the chain cover 33 can be readily fastened to the chain cover fastening portion 40 from the outside in the vehicle width direction.

Furthermore, the end portion 40b, on the inside in the vehicle width direction, of the chain cover fastening portion 40 is disposed on the inside in the vehicle width direction with respect to the side surface portion 43, which is the portion inside, in the vehicle width direction, of a portion disposed inferior to and posterior to the end portion 40b in the swing arm 13.

Through the foregoing configuration, because the gap G between the chain cover fastening portion 40 and the rear wheel-side protruding portion 58 is narrow, so that a fallen off chain 32 can be received effectively.

Additionally, the rear wheel-side protruding portion 58 serves as the fastening part 55, which fastens the sprocket 31 to the rear wheel 3.

Through the foregoing configuration, the chain 32 can be received by a simple structure using the fastening part 55, which fastens the sprocket 31 to the rear wheel 3.

Additionally, the chain cover fastening portion 40 is formed integrally with the swing arm 13.

Through the foregoing configuration, the chain cover fastening portion 40 can be easily provided.

It should be understood that the foregoing embodiment represents only one mode to which the present invention is applied and that the present invention is not limited to the foregoing embodiment.

Although the above-described embodiment exemplifies the motorcycle 1 as the saddle riding vehicle, the present invention is not limited thereto and can be applied to a three-wheeled saddle riding vehicle including two front wheels or two rear wheels or a saddle riding vehicle including four or more wheels.

DESCRIPTION OF REFERENCE SYMBOLS

1 Motorcycle (saddle riding vehicle)
3 Rear wheel
13 Swing arm
31 Sprocket
32 Chain
33 Chain cover
37 Upper surface
39 Superiorly extended portion
40 Chain cover fastening portion
40a Outer side surface
40b End portion
43 Side surface portion
55 Fastening part
58 Rear wheel-side protruding portion
G Gap
W Width

The invention claimed is:

1. A saddle riding vehicle comprising:
 a swing arm that supports a rear wheel;
 a sprocket disposed at the rear wheel; and
 a chain that meshes with the sprocket to thereby drive the rear wheel, wherein
 the rear wheel includes a rear wheel-side protruding portion that protrudes from the sprocket to an outside in a vehicle width direction,
 a chain cover fastening portion to which a chain cover for covering the chain is fastened, is disposed on the outside in the vehicle width direction with respect to the rear wheel-side protruding portion and protrudes to an inside in the vehicle width direction,
 the chain cover fastening portion is disposed at a position at which the chain cover fastening portion overlaps the rear wheel-side protruding portion in a vehicle side view, and
 a gap between the chain cover fastening portion and the rear wheel-side protruding portion in the vehicle width direction is smaller than a width of the chain under a condition in which the chain cover fastening portion overlaps the rear wheel-side protruding portion.

2. The saddle riding vehicle according to claim 1, wherein the chain cover fastening portion is disposed superior to an upper surface of the swing arm.

3. The saddle riding vehicle according to claim 2, wherein the chain cover fastening portion extends to the inside in the vehicle width direction from a superiorly extended portion that extends superiorly from the upper surface of the swing arm.

4. The saddle riding vehicle according to claim 3, wherein the chain cover is fastened to an outer side surface on the outside in the vehicle width direction of the chain cover fastening portion.

5. The saddle riding vehicle according to claim 1, wherein an end portion on the inside in the vehicle width direction of the chain cover fastening portion is disposed on the inside in the vehicle width direction with respect to a side surface portion that is a portion inside, in the vehicle width direction, of a portion disposed inferior to and posterior to the end portion in the swing arm.

6. The saddle riding vehicle according to claim 1, wherein the rear wheel-side protruding portion serves as a fastening part that fastens the sprocket to the rear wheel.

7. The saddle riding vehicle according to claim 1, wherein the chain cover fastening portion is formed integrally with the swing arm.

* * * * *